Patented Mar. 17, 1953

2,631,995

UNITED STATES PATENT OFFICE 2,631,995

ACRYLONITRILE POLYMERS

Herman A. Bruson, Shaker Heights, Ohio, assignor to Industrial Rayon Corporation, Cleveland, Ohio, a corporation of Delaware No Drawing. Application December 15, 1949,
Serial No. 133,225

15 Claims. (Cl. 260—79.3)

This invention relates to the preparation of polymeric materials and to the shaped articles formed therefrom, e. g., films, fibers, threads, bristles, mono-filaments, etc., which articles are particularly adapted to being dyed. More particularly, this invention is concerned with copolymer products made by the copolymerization of acrylonitrile with minor proportions of certain amino-allylic ethers or salts thereof, and, if desired, containing other polymerizable monoethylenic compounds. This invention is particularly concerned with copolymers adapted to the formation of molecularly oriented structures such as fibers, threads, yarns and the like, which structures show improved dyeing properties.

It is generally recognized that oriented fibers or threads made from copolymers of acrylonitrile having a major proportion of acrylonitrile in the polymer molecule and particularly those having high percentages of acrylonitrile, e. g., about 85% or more, are more desirable because of their higher softening points, thermal stability and tensile strength. There is, however, a problem regarding the dyeing properties of polymeric materials containing high percentages of acrylonitrile with or without other polymerizable compounds. It appears that such materials generally are difficult to dye in aqueous dye baths with many of the ordinary water-soluble dyestuffs by the usual methods employed in the textile industry, because they are not easily penetrated by the dye solution. Attempts to reduce or eliminate this difficulty have not been generally successful since either the color, or the fiber properties such as the strength or the shrinking, softening or "sticking" point have been adversely affected, or the dye uptake by the fiber has been mediocre or non-uniform. Likewise, in these attempts, the dyed fibers, generally, on exposure to weathering, sunlight, or repeated launderings with soap and water, have either faded or shown a leaching out or release of the dyestuff from the polymer.

It has now been found that copolymer compositions of acrylonitrile and mono-allyl or mono-methallyl ethers of saturated amino alcohols or salts thereof, may be prepared, which polymeric compositions are particularly adapted to being dyed with acid dyestuffs and to the formation of molecularly oriented shaped articles, e. g., high strength oriented fibers. In general, such shaped articles may be produced in accordance with this invention by dissolving the new copolymers in a suitable solvent, extruding and coagulating the copolymers into a shaped article and thereafter subjecting the article to such further treatment, e. g., cold drawing, thermal stretching, heat treating, dyeing, finishing, etc., as may be necessary to give the article the desired properties.

The new copolymers can be prepared by polymerizing a mixture comprising acrylonitrile and a mono-allyl or mono-methallyl ether of a saturated amino alcohol or a salt thereof. Suitable amino-allylic ethers which can be employed as comonomers with acrylonitrile, are those derived from primary, secondary or tertiary saturated amino alcohols. If desired, these monomeric ethers may possess more than one amino or hydroxy group and may be aliphatic, arimatic, arylaliphatic, cycloaliphatic or heterocyclic in character. The ethers must, however, have not more than one olefinic double bond in the molecule. The ethers of this invention have the formula

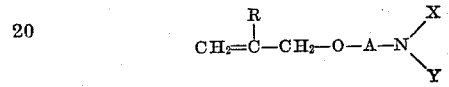

wherein "R" is a member of the group consisting of hydrogen and methyl radicals; "A" is a member of the group consisting of alkylene, hydroxyalkylene and oxyalkylene radicals having not less than two carbon atoms nor more than four carbon atoms; and "X" and "Y" taken singly as separate radicals are members of the group consisting of hydrogen, alkyl, hydroxyalkyl, alkoxyalkyl, aminoalkyl, acylaminoalkyl, cyanoalkyl, cycloalkyl, aralkyl, and aryl radicals; and "X" and "Y" taken jointly can form a saturated heterocyclic radical with the N atom such as, for example, a morpholino, piperidino or other heterocyclic radical.

Typical allyl and methallyl ethers of saturated amino alcohols useful for the purpose of this invention are, for example, the following:

$CH_2=CH-CH_2-O-CH_2-CH_2-N(CH_3)_2$

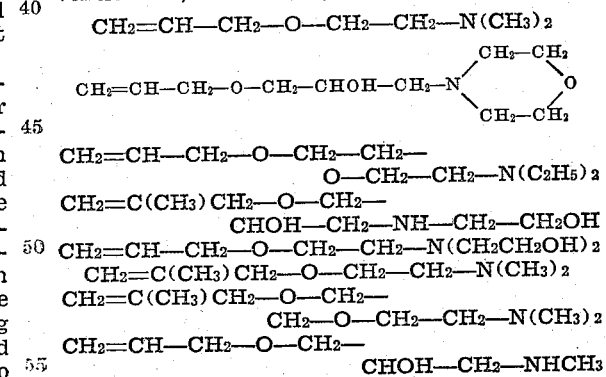

$CH_2=CH-CH_2-O-CH_2-CH_2-$
$\qquad O-CH_2-CH_2-N(C_2H_5)_2$
$CH_2=C(CH_3)CH_2-O-CH_2-$
$\qquad CHOH-CH_2-NH-CH_2-CH_2OH$
$CH_2=CH-CH_2-O-CH_2-CH_2-N(CH_2CH_2OH)_2$
$CH_2=C(CH_3)CH_2-O-CH_2-CH_2-N(CH_3)_2$
$CH_2=C(CH_3)CH_2-O-CH_2-$
$\qquad CH_2-O-CH_2-CH_2-N(CH_3)_2$
$CH_2=CH-CH_2-O-CH_2-$
$\qquad CHOH-CH_2-NHCH_3$

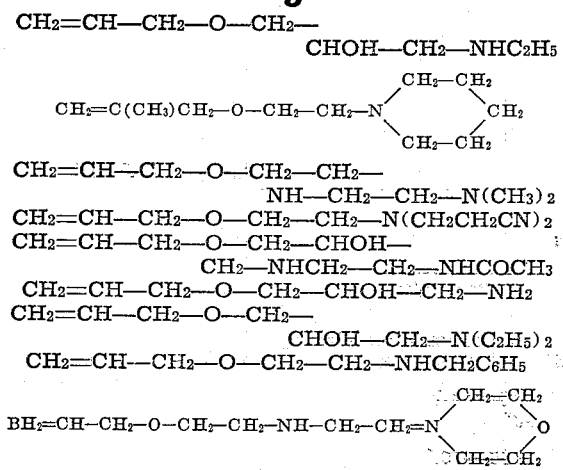

CH₂=CH—CH₂—O—CH₂—CH₂—NH—CH₂—CH₂—N(CH₃)₂
CH₂=CH—CH₂—O—CH₂—CH₂—N(CH₂CH₂CN)₂
CH₂=CH—CH₂—O—CH₂—CHOH—CH₂—NHCH₂—CH₂—NHCOCH₃
CH₂=CH—CH₂—O—CH₂—CHOH—CH₂—NH₂
CH₂=CH—CH₂—O—CH₂—CHOH—CH₂—N(C₂H₅)₂
CH₂=CH—CH₂—O—CH₂—CH₂—NHCH₂C₆H₅

BH₂=CH—CH₂—O—CH₂—CH₂—NH—CH₂—CH₂—N⟨CH₂—CH₂⟩O⟨CH₂—CH₂⟩

Advantageous copolymer materials may be prepared, for example, by the use of monomeric allylic ethers in which "R" of the structural formula above, is hydrogen and "A" is a hydroalkylene radical. Particular advantages are derived when using those allyl ethers of the above formula in which "A" is a hydroxyalkylene radical containing three carbon atoms and especially when, in addition to the above, either "X" or "Y" in the above formula is a hydrogen radical and the other is either hydrogen or a short chain alkyl or hydroxyalkyl radical of the order of about one or two carbon atoms.

In general, the amount of the amino-allylic ether desirable in the copolymer, varies inversely with the basic nitrogen content of such ether. Thus, the greater the basic nitrogen content, the smaller is the amount thereof required. Although greater amounts of the ether may be employed if desired in the polymerization, it is advantageous to use up to about 10% by weight based on the total weight of monomers. Particular advantages such as, for example, improved fiber properties and dyeing, are derived when amounts between about 3% and 7% by weight are used. Where the lower molecular weight allylic ethers are employed, smaller amounts thereof may be employed with advantage, e. g., between about 1% and 5%. When employing any of the above proportions of ether, copolymers having more advantageous physical properties are obtained when the copolymer molecule contains at least 80% by weight of acrylonitrile.

Instead of employing the monomeric amino-allylic ethers in the form of their free bases, it is often more advantageous to use them in the form of their water-soluble salts. Such salts may be formed by the reaction of the basic ethers with inorganic or organic acids, or if desired, the salts can be in the form of water-soluble quaternary ammonium salts which can be made by the reaction of the basic ethers with various alkylating agents. In these situations, the anion portion of the salt is chemically united with the basic nitrogen atom of the copolymer molecule.

Typical of the monomeric amino-allylic ether salts formed with acids are those obtained by treatment of the basic allyl and methallyl ethers with aqueous hydrochloric, sulfuric, nitric, phosphoric or boric acids, or organic acids such as formic, acetic, glycolic, lactic, crotonic, maleic, tartaric, citric, itaconic, acrylic, methacrylic, chloracetic, fumaric, oxalic, or other acids. Typical of the monomeric quaternary ammonium salts are those which can be prepared by reacting the basic amino ethers with methyl bromide, ethyl bromide, dimethyl sulfate, methyl phenyl sulfonate, diethyl sulfate, benzyl chloride, and other alkylating agents.

The copolymers of this invention may be prepared under any suitable copolymerization conditions. Especially suitable are the redox-type polymerization reactions which employ peroxides and persulfates as oxygen-yielding catalysts in the presence of sulfites such as, for example, sodium bisulfite, sodium hydrosulfite, etc.

The shaped articles may be formed from solutions of the above-mentioned copolymers by extruding the solutions into suitable coagulating media, e. g., evaporative atmospheres, coagulating baths, etc. The shaped articles such as filamentary materials, produced in this manner, may then be treated to remove the residual solvent such as by washing with an aqueous medium, and thereafter, stretched and heat treated so as to produce oriented products having high tenacity, high elastic recovery, low shrinkage, etc.

This invention will be more fully described by the following examples, although, it is understood that the invention is not intended to be limited by these examples. In these examples, "parts" and "percent" of materials is intended to mean parts and percent by weight.

*Example I*

A mixture of 193 parts acrylonitrile and 7.7 parts gamma - morpholino - beta - hydroxypropyl allyl ether

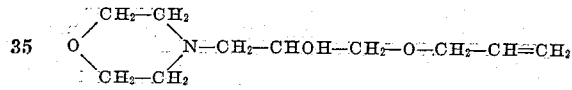

was added rapidly to a stirred mixture of 1200 parts water, 38.1 parts one normal sulfuric acid, 3.5 parts potassium persulfate and 1.5 parts sodium bisulfite in an atmosphere of nitrogen. The temperature was maintained at 55° C. during the addition and during the course of the polymerization by occasional cooling. When the exothermic reaction had ceased, an additional 2 parts potassium persulfate and 2 parts sodium bisulfite was added and the mixture stirred for 2½ hours at 50-55° C. The white powdery copolymer which was formed, was then filtered off, washed and dried, yielding about 196 parts of product.

A 20% solution of this copolymer (average molecular weight 55,000) in ethylene carbonate was prepared and the solution extruded at 120° C. through a 40-hole spinneret (.003 inch diameter holes) into a bath of triethylene glycol heated to 120-130° C. The coagulated bundle of filaments was led between two spaced guides for a distance of 25 inches bath travel to a second bath consisting of tetraethylene glycol heated to 140° C. where it was stretched between two positively rotated drums to about 8.55 times its original length, the second drum being driven at a higher speed, namely, about 125 meters per minute. The yarn thus obtained was washed with cold water and air dried.

The yarn was then passed in a relaxed condition through a heated chamber positioned between two positively-driven drums having different peripheral speeds at 135° C. for five minutes, the second or take-up drum being rotated 0.855 times as rapidly as the first drum. The yarn thus obtained had a white, substantially non-discolored appearance and had a tenacity of 4.4 grams per denier and an elongation of 18.2 percent at break. This yarn was then dyed a deep orange by boiling for thirty minutes in an aqueous dye-bath containing 0.2% to 2% of sulfuric acid and 0.2% to 5% of the dyestuff known as "Orange Y Conc." (color index No. 151). The dyed yarn thus obtained was then washed and boiled with soapy water to remove any unabsorbed dye. After drying, the yarn was found to be evenly and intensely dyed and was fast to laundering.

In contrast to the above, a sample of yarn prepared in a similar manner, but solely from polyacrylonitrile without the gamma-morpholino-beta-hydroxypropyl allyl ether, was found to be incapable of being dyed under the same conditions.

The gamma-morpholino-beta-hydroxypropyl allyl ether used above as the comonomer may be prepared by reacting morpholine with allyl glycidyl ether or by boiling equimolecular proportions of morpholine and 1-allyloxy-3-chloro-2-propanol in the presence of excess 20% aqueous caustic soda solution. It is a colorless water-soluble liquid boiling at 123° C./3 mm.

*Example II*

A mixture of 192 parts acrylonitrile and 8 parts gamma-N-piperidino-beta-hydroxypropyl allyl ether

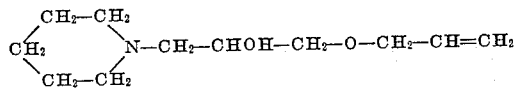

(B. P. 81° C./0.6 mm.) in the form of its hydrochloric acid salt was polymerized under the conditions described in Example I, except that the sulfuric acid was excluded from the polymerization reaction mixture. The copolymer in the form of a film or yarn can be dyed with typical acid dyestuffs such as Brilliant Croceine and Orange Y in aqueous solution made acidic with sulfuric acid or acetic acid.

*Example III*

A mixture consisting of 190 parts of acrylonitrile and 16 parts of the quaternary ammonium salt having the formula

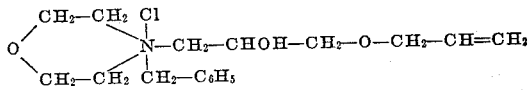

(M. P. 138° C.; made by reacting benzyl chloride with gamma - morpholino - beta - hydroxypropyl allyl ether) was polymerized under the conditions described in Example I, except that the sulfuric acid was excluded from the polymerization reaction mixture. The copolymer obtained may be formed into a yarn that can be dyed readily with aqueous solutions of dyestuffs containing sulfonic acid groups, whereas under the same conditions, polyacrylonitrile remains undyed. Typical of such dyestuffs are Fast Acid Green B, Wool Orange 3G, Quinoline Yellow, Acid Black 10BN, and Acid Scarlet 2B, when employed in acidified aqueous solution according to customary dyeing procedure. Instead of employing the quaternary benzyl chloride salt as the comonomer, the quaternary methyl bromide or dimethyl sulfate salt can be used to give fibers and other shaped articles capable of being dyed with acid dyes.

In a similar manner, the other allyl or methallyl ethers of amino alcohols as set forth herein can be copolymerized with acrylonitrile to yield white powdery copolymers which in the form of shaped objects such as threads, foils, and films can be readily dyed with acid or wool dyes.

*Example IV*

To a stirred solution of 1200 parts distilled water, 3.5 parts potassium persulfate and 1.75 parts potassium metabisulfite in an atmosphere of nitrogen, was added at 54° C. a mixture of 195 parts acrylonitrile and gamma-amino-beta-hydroxypropyl allyl ether sulfate prepared by mixing 38.2 parts one normal sulfuric acid with 5 parts

(B. P. 69° C./0.6 mm., made by reacting ammonium hydroxide with allyl glycidyl ether). The temperature was maintained at 52-55° C. by occasional cooling. When no more heat was evolved, an additional 1 part potassium persulfate and 0.5 part potassium metabisulfite was added and the temperature maintained at 47-51° C. for 20 minutes. The white powdery copolymer formed was then filtered off, washed and dried, yielding about 191 parts of product. This copolymer can be dissolved in an appropriate solvent such as, for example, ethylene carbonate, and spun to form strong, substantially white, fibers that have an affinity for acid dyestuffs.

*Example V*

The polymerization reaction was conducted in a manner similar to Example IV, but employing a mixture of 1200 parts water, 3.5 parts potassium persulfate, 1.48 parts sodium bisulfite, 191.5 parts acrylonitrile, 38.1 parts one normal sulfuric acid and 8.5 parts gamma-(N-methylanilino)-beta-hydroxypropyl allyl ether

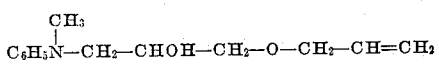

The above allyl ether (B. P. 126° C./0.8 mm.) is made by reacting N-methyl aniline with allyl glycidyl ether. The yield of white powdery copolymer was 195 parts, which copolymer can be spun into fibers having enhanced affinity for acid dyes.

*Example VI*

A mixture of 193 parts acrylonitrile and 6.7 parts gamma - (hydroxyethylamino) - beta - hydroxypropyl allyl ether

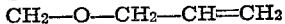

(B. P. 128° C./0.7 mm.; made by reacting ethanolamine with allyl glycidyl ether) was added to a stirred solution of 1200 parts water, 38.2 parts one normal sulfuric acid, 3.5 parts potassium persulfate and 1.75 parts potassium metabisulfite at 56-60° C. in an atmosphere of nitrogen. After the exothermic reaction had ceased, an additional quantity of 1 part potassium persulfate and 0.5 part potassium metabisulfite was added and the polymerization completed at 60° C. The white powdery copolymer which was formed, was filtered off, washed and dried, yielding 194 parts of product. In the form of film or yarn, this copolymer has a high affinity for acid dyes.

*Example VII*

A copolymer was prepared under the polymerization conditions of Example I, using 195 parts acrylonitrile and 5 parts gamma-(N-morpholino)-beta-hydroxypropyl methallyl ether

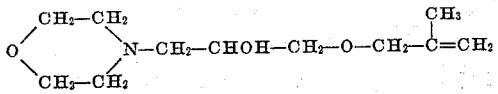

in the form of its sulfuric acid salt. A white powdery copolymer weighing 192 parts was obtained which in the form of yarn can be dyed with the common acid dyes.

*Example VIII*

A copolymer was prepared under the polymerization conditions of Example I, using 195 parts acrylonitrile and 5 parts allyloxyethylamine

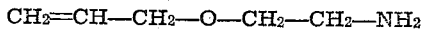

in the form of its sulfuric acid salt. A white powdery copolymer weighing 194 parts was obtained which in the form of films or yarn has a high affinity for wool dyes.

*Example IX*

A copolymer was prepared by the procedure of Example I, using 195 parts acrylonitrile and 5 parts allyloxyethoxyethylmorpholine

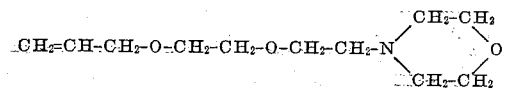

in the form of its acetic acid salt. The white powdery copolymer weighed 191 parts. In the form of yarn, it could be readily dyed with Orange Y or other acid dyestuffs.

*Example X*

A copolymer was prepared by the procedure of Example I, using 190 parts acrylonitrile, 5 parts methacrylamide, and 5 parts

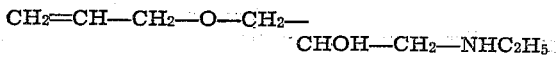

(B. P. 65° C./0.4 mm.) in the form of its sulfuric acid salt. The yield of white powdery copolymer was about 196 parts. It was dissolved in ethylene carbonate to give a 20% solids solution. This solution was extruded through a 40-hole (.003 inch diameter) spinneret at 120° C. into a bath of tetraethylene glycol heated to 120–130° C.

The bundle of filaments thus obtained was washed with water and stretched ten times its original length by passing the filaments through a hot tube at 150–160° C. The stretched filaments were dried and passed tensionless over a heated rotating drum at 180° C. to relax the oriented filaments. The resulting yarn was white and substantially non-discolored and had a tenacity of 4.3 grams per denier, elongation of 18.1 percent at break. It possessed greater affinity for acid dyes, than a control made from a copolymer without the gamma-ethylamino-beta-hydroxypropyl allyl ether.

The acrylonitrile-amino-allyl or methallyl ether copolymers of this invention may contain minor quantities of other polymerizable monoethylenic compounds such as, for example, compounds having the grouping $CH_2=C=$ or $-CH=CH-$, e. g., vinyl esters, vinyl ethers, and vinyl ketones; acrylic acid and its esters and amides; methacrylic acid and its esters, amides, or nitrile; maleic, itaconic and fumaric acids and their esters, amides or nitriles; allyl alcohol and its esters; styrene, and substituted styrenes, e. g., chloro and dichloro-styrenes; halogenated monoethylenic compounds such as vinyl chloride, vinyl fluoride and vinylidene chloride; isopropenyl acetate; and the like. In general, these polymerizable monoethylenic compounds should be present in amounts less than about 25% of the total monomer weight, and in the production of fibers, preferably in amounts less than about 10%. Advantageously in the production of fibers, the percentage of acrylonitrile in the copolymer molecule should be at least 80%.

For example, in place of the methacrylamide in Example X, one can use an equal quantity of styrene, acrylamide, vinyl acetate, methyl methacrylate, isopropenyl acetate, ethyl acrylate, diethyl maleate, dimethyl fumarate, vinyl chloride, or other copolymerizable vinyl or vinylidene compounds and thereby obtain, in conjunction with the basic allyl ethers in the same way, copolymers having enhanced affinity for acid dyes.

The molecular weights of these polymers and copolymers are preferably within the range of 10,000 and 250,000, or even higher, although polymers having molecular weights between 40,000 and 150,000 may be used with particular advantage in the production of shaped articles such as filaments, threads, yarns, etc.

In the production of filamentary materials, e. g., fibers, threads, yarns, etc., from the copolymers of the invention, it is usually necessary to prepare solutions of these copolymers which may be extruded into suitable coagulating media such as, for example, evaporative atmospheres, coagulating baths, etc. In general, these spinning solutions may be prepared by heating the finely divided acrylonitrile copolymers of this invention in the presence of a suitable solvent at temperatures between about 50–100° C. or higher depending upon the particular solvent being employed. Typical preferred solvents which may be used are various organic solvents such as N,N-dimethyl formamide, or N,N-dimethyl acetamide; or the non-nitrogen-containing solvents such as the lactones, e. g. gamma-valerolactone, or the cyclic carbonates, e. g. ethylene carbonate. With advantage, particularly in the production of fibers, the heated mixtures of polymer and solvent are maintained in inert or oxygen-free atmospheres to minimize discoloration. Preferably, the spinning solutions should have a solids content between about 10% and 30% by weight solids.

For various purposes it may be desirable to chemically and physically modify these polymer solutions by the presence of other materials such as, for example, pigments, plasticizers, stabilizers, spinning agents, etc.

If desired, filamentary materials may be prepared from the above spinning solutions by extruding the solutions into suitable liquid coagulating media or, in certain instances, by dry spinning. Typical of the liquid coagulating media are mono or polyhydric alcohols or mixtures thereof such as, for example, glycerol, ethylene glycol, tetraethylene glycol, ethyl alcohol, and the like; or aqueous coagulating solutions of various inorganic salts may be used, for example, calcium chloride, zinc chloride, etc. If desired, water either alone or in combination with any of the above-mentioned coagulants may be used. In general, the temperature of the spinning solution at extrusion should be maintained between about 80–150° C., and the coagulant at a temperature between about 50–150° C., or if desired, at a higher temperature such as, for example, up to about 175° C.

The resulting coagulated material may then be withdrawn from the liquid coagulating medium and thereafter washed with an aqueous medium such as water. Washed articles such as threads and yarns may thereafter be stretched up to 600–1000 percent or more. Such stretching may be accomplished in secondary baths containing materials similar to those of the coagulating medium employed, or if desired, other heated media may be employed such as, for example, inert liquids, vapors or gases, e. g., steam.

The washed and stretched products may be heat treated while in a relaxed condition at temperatures between about 100° C. and 180° C. to improve their physical properties. By "relaxed condition," is included the heat treatment of threads and yarns at no tension at all or preferably, at relatively low tensions such as, for example, between about 0.01 and 0.3 gram per denier.

Oleaginous materials such as finishing oils or waxes, may be applied to the yarn and thread products after the heat treating step, or if desired, before the heat treating step.

Fibers obtained in accordance with the invention can be stretched to form oriented structures of high tenacity and high elastic recovery. These stretched fibers exhibit characteristic X-ray patterns showing orientation along the fiber axis. Yarns made from these fibers may be used in the manufacture of hosiery and, because of their heat-resistance, may also be fashioned into more general, all-purpose fabrics such as for blouses, suits, skirts, etc.

I claim:

1. As a new composition of matter, a copolymer derived by the polymerization of a mixture comprising acrylonitrile and an ether compound selected from the group consisting of a mono-allylic ether of a saturated amino alcohol, a water-soluble salt of said allylic ether formed with an acid, and a water-soluble quaternary ammonium salt of said allylic ether; said allylic ether having the formula

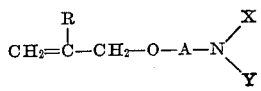

wherein "R" is a member of the group consisting of hydrogen and methyl radicals; "A" is a member of the group consisting of alkylene, hydroxyalkylene and oxyalkylene radicals, said radicals having not less than two nor more than four carbon atoms; and "X" and "Y" taken singly are members of the group consisting of hydrogen, alkyl, hydroxyalkyl, alkoxyalkyl, aminoalkyl, acylaminoalkyl, cyanoalkyl, cycloalkyl, aralkyl, and aryl radicals; and "X" and "Y" taken jointly can form a saturated heterocyclic radical with the N atom; said acrylonitrile in said mixture comprising at least about 80% of the total monomer weight and said ether compound in said mixture comprising between about 1 and 10% of the total monomer weight.

2. As a new composition of matter, a copolymer derived by the polymerization of a mixture comprising acrylonitrile and a water-soluble salt of gamma - morpholino - beta - hydroxypropyl allyl ether formed with an acid; said acrylonitrile in said mixture comprising at least about 80% of the total monomer weight and said ether compound in said mixture comprising between about 1 and 10% of the total monomer weight; said copolymer having a molecular weight between about 40,000 and 150,000.

3. As a new composition of matter, a copolymer derived by the polymerization of a mixture comprising acrylonitrile and gamma-morpholino-beta-hydroxypropyl allyl ether; said acrylonitrile in said mixture comprising at least about 80% of the total monomer weight and said allyl ether compound in said mixture comprising between about 1 and 10% of the total monomer weight; said copolymer having a molecular weight between about 40,000 and 150,000.

4. As a new composition of matter, a copolymer derived by the polymerization of a mixture comprising acrylonitrile and a water-soluble salt of gamma - hydroxyethyl - amino - beta-hydroxypropyl allyl ether formed with an acid; said acrylonitrile in said mixture comprising at least about 80% of the total monomer weight and said ether compound in said mixture comprising between about 1 and 10% of the total monomer weight; said copolymer having a molecular weight between about 40,000 and 150,000.

5. As a new composition of matter, a copolymer derived by the polymerization of a mixture comprising acrylonitrile and gamma-hydroxyethyl-amino-beta-hydroxypropyl allyl ether; said acrylonitrile in said mixture comprising at least about 80% of the total monomer weight and said allyl ether compound in said mixture comprising between about 1 and 10% of the total monomer weight; said copolymer having a molecular weight between about 40,000 and 150,000.

6. A molecularly oriented fiber which exhibits characteristic crystalline X-ray diffraction patterns comprising the copolymer as defined in claim 1.

7. A molecularly oriented fiber which exhibits characteristic crystalline X-ray diffraction patterns comprising the copolymer as defined in claim 2.

8. A molecularly oriented fiber which exhibits characteristic crystalline X-ray diffraction patterns comprising the copolymer as defined in claim 3.

9. A molecularly oriented fiber which exhibits characteristic crystalline X-ray diffraction patterns comprising the copolymer as defined in claim 4.

10. A molecularly oriented fiber which exhibits characteristic crystalline X-ray diffraction patterns comprising the copolymer as defined in claim 5.

11. As a new composition of matter, a copolymer derived by the polymerization of a mixture comprising acrylonitrile and a mono-allylic ether of a saturated amino alcohol; said allylic ether having the formula

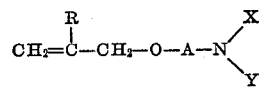

wherein "R" is a member of the group consisting of hydrogen and methyl radicals; "A" is a member of the group consisting of alkylene, hydroxyalkylene and oxyalkylene radicals, said radicals having not less than two nor more than four carbon atoms; and "X" and "Y" taken singly are members of the group consisting of hydrogen, alkyl, hydroxyalkyl, alkoxyalkyl, aminoalkyl, acylaminoalkyl, cyanoalkyl, cycloalkyl, aralkyl, and aryl radicals; and "X" and "Y" taken jointly can form a saturated heterocyclic radical with the N atom; said acrylonitrile in said mixture comprising at least about 80% of the total monomer weight and said ether compound in said mixture comprising between about 1 and 10% of the total monomer weight.

12. As a new composition of matter, a copolymer derived by the polymerization of a mixture comprising acrylonitrile and a water-soluble salt of a mono-allylic ether of a saturated amino alcohol formed with an acid; said allylic ether having the formula

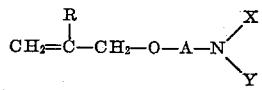

wherein "R" is a member of the group consisting of hydrogen and methyl radicals; "A" is a member of the group consisting of alkylene, hydroxyalkylene and oxyalkylene radicals, said radicals having not less than two nor more than four carbon atoms; and "X" and "Y" taken singly are members of the group consisting of hydrogen, alkyl, hydroxyalkyl, alkoxyalkyl, aminoalkyl, acylaminoalkyl, cyanoalkyl, cycloalkyl, aralkyl, and aryl radicals; and "X" and "Y" taken jointly can form a saturated heterocyclic radical with the N atom; said acrylonitrile in said mixture comprising at least about 80% of the total monomer weight and said ether compound in said mixture comprising between about 1 and 10% of the total monomer weight.

13. As a new composition of matter, a copolymer derived by the polymerization of a mixture comprising acrylonitrile and a water-soluble quaternary ammonium salt of a monoallylic ether of a saturated amino alcohol; said allylic ether having the formula

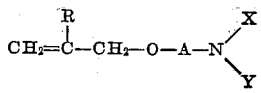

wherein "R" is a member of the group consisting of hydrogen and methyl radicals; "A" is a member of the group consisting of alkylene, hydroxyalkylene and oxyalkylene radicals, said radicals having not less than two nor more than four carbon atoms; and "X" and "Y" taken singly are members of the group consisting of hydrogen, alkyl, hydroxyalkyl, alkoxyalkyl, aminoalkyl, acylaminoalkyl, cyanoalkyl, cycloalkyl, aralkyl, and aryl radicals; and "X" and "Y" taken jointly can form a saturated heterocyclic radical with the N atom; said acrylonitrile in said mixture comprising at least about 80% of the total monomer weight and said ether compound in said mixture comprising between about 1 and 10% of the total monomer weight.

14. As a new composition of matter, a copolymer according to claim 2 in which the water-soluble salt is formed with sulfuric acid.

15. As a new composition of matter, a copolymer according to claim 2 in which the water-soluble salt is formed with hydrochloric acid.

HERMAN A. BRUSON.

REFERENCES CITED

The following references are of record in the file of this patent:

UNITED STATES PATENTS

| Number | Name | Date |
|---|---|---|
| 2,098,108 | Reppe et al. | Nov. 2, 1937 |
| 2,487,859 | Dickey et al. | Nov. 15, 1949 |